Nov. 1, 1960

W. E. ELDRED 2,958,485

SHOCK STRUT

Filed July 2, 1956

INVENTOR.
WENDELL E. ELDRED
BY
John A. Young
ATTORNEY

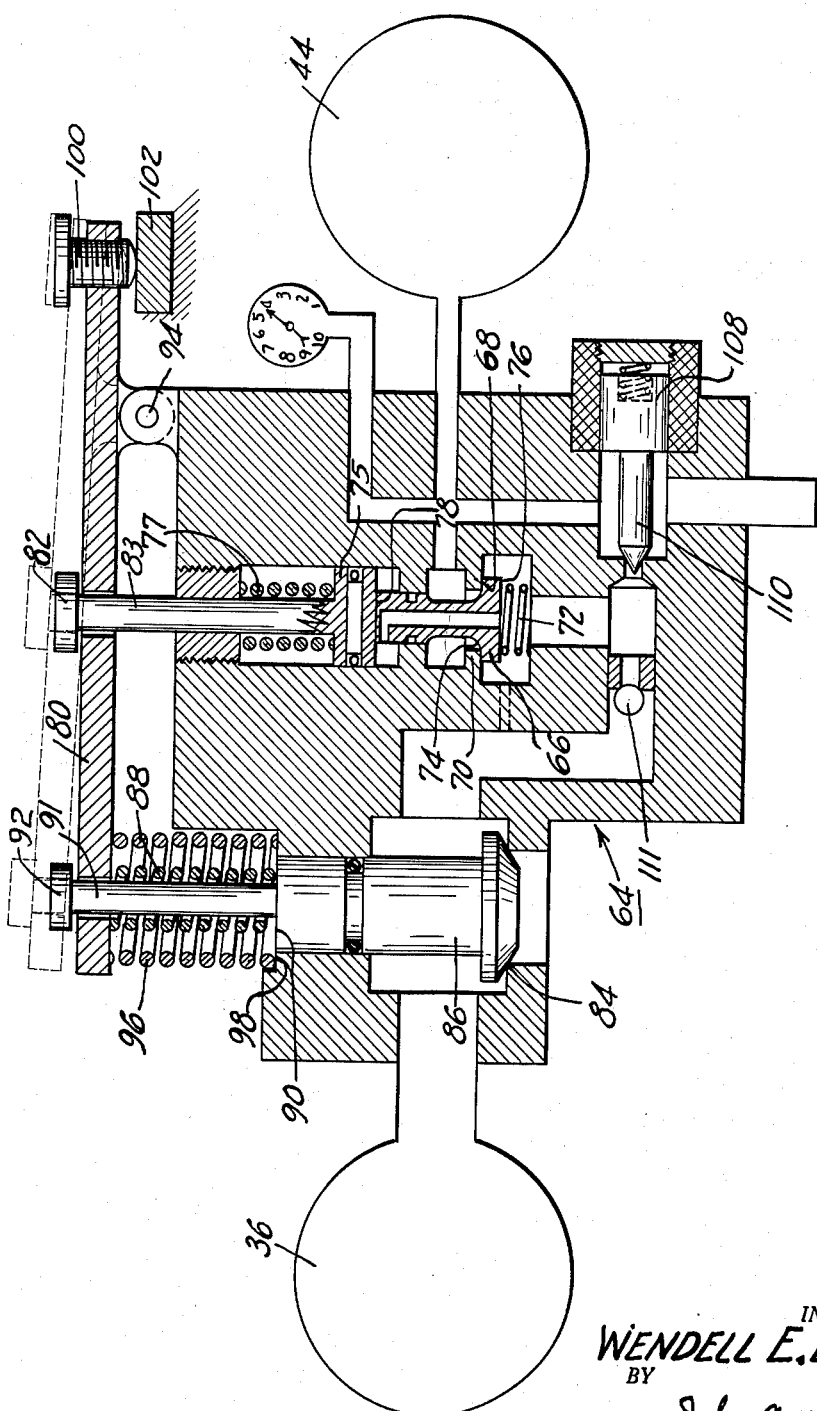

United States Patent Office 2,958,485
Patented Nov. 1, 1960

2,958,485

SHOCK STRUT

Wendell E. Eldred, South Bend, Ind., assignor to The Bendix Corporation, a corporation of Delaware Filed July 2, 1956, Ser. No. 595,265

5 Claims. (Cl. 244—102)

This invention relates to a shock strut for aircraft. The shock strut invention is designed to cushion the impact of landing the aircraft and also provide resilient support for the aircraft during taxiing.

One of the objects of this invention is to obtain a method for controlling the "air spring" resistance so that the aircraft can land with heavier loads.

A further object of the invention is to discharge the compressed air chamber cushion which resists contraction of the strut so that following take-off, the strut can be telescoped into a smaller package and then retracted within a wheel well of the aircraft.

It is a further object of the invention that the air chamber which cushions the strut will be automatically recharged when the strut is swung from the wheel well and brought to an extendible position.

One of the important features of this invention is that charging and discharging the air cushion chamber is done automatically by a control means which operates according to the location of the strut while it is being either retracted or lowered for landing.

Other objects and features of the invention will become apparent from a consideration of the following description which proceeds with reference to the accompanying drawings, wherein:

Figure 3 is a schematic view of the control means for charging and discharging the pneumatic cushioning chamber of the strut.

Figure 1:
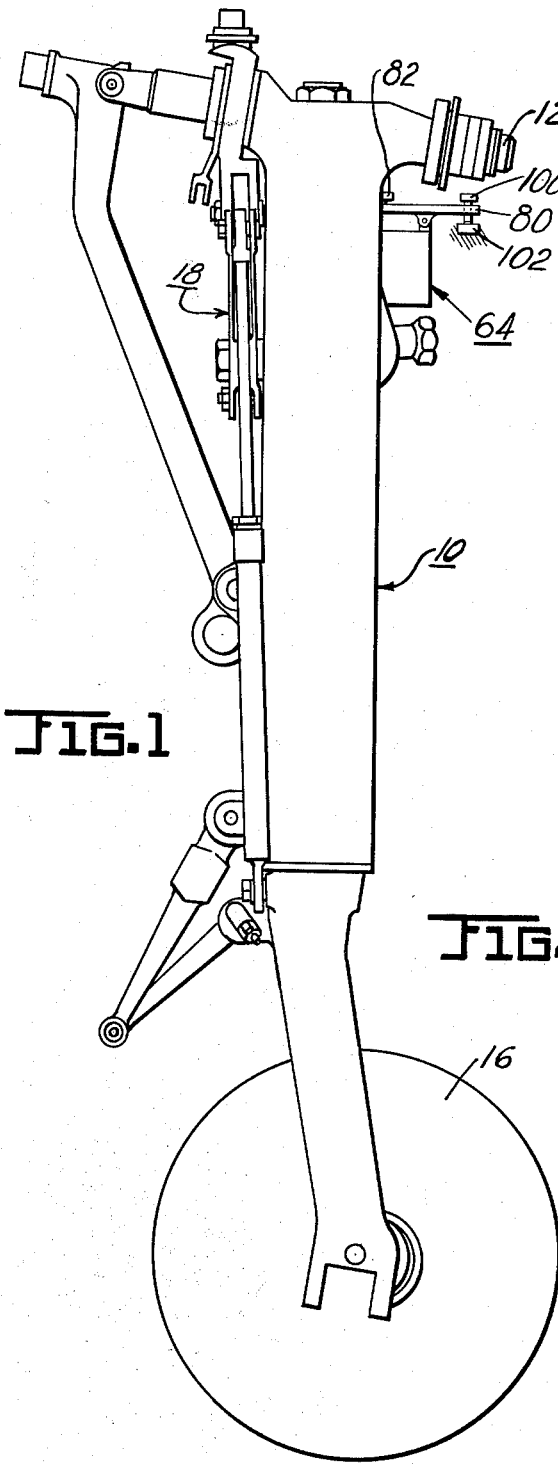
Figure 1 is a schematic view of the strut depending from an aircraft wing or fuselage.

Referring to Figure 1, the shock strut, designated generally by reference numeral 10, has pivoted mounting 12 with an aircraft wing or fuselage (not shown) from which it depends during a landing. A ground engageable wheel 16 is carried on the end of the strut. A shrinkage mechanism 18 is provided to retract the strut into a wheel well (not shown) by exerting a lifting force on the strut. The shrinkage mechanism 18 also contracts the strut during retraction so that it will fit into a smaller space.

Figure 2:
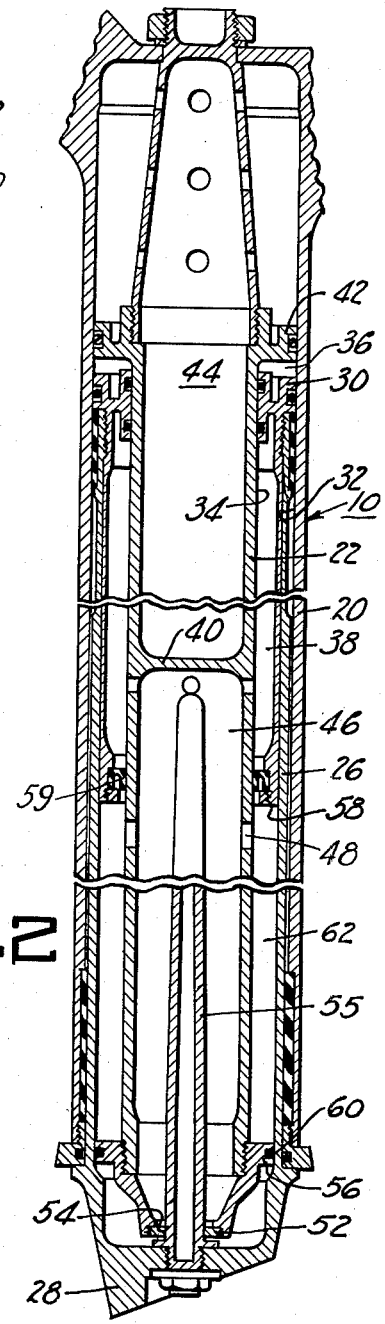
Figure 2 is a section view of the strut taken through the longitudinal axis of the strut.

Referring next to Figure 2, the details of the strut construction will be considered. The strut in Figure 2 is shown fully contracted or collapsed. The strut 10 comprises two concentric tubular members 20 and 22 which are fixed at an appropriate location to the underside of the aircraft. A third tubular member 26 mounted for reciprocable movement between tubular members 20 and 22, is provided with an extension 28 which carries ground engageable wheel 16 at the end thereof. Tubular member 26 has a piston 30 which is slidable along the inner surface 32 of tubular member 20 and the outer surface 34 of tubular member 22. The space between the relatively fixed tubular members 20 and 22 is divided by the piston 30 into two variable volume chambers, one designated a pneumatic chamber 36 and the other a hydraulic chamber 62.

The innermost tubular member 22 has a partition 40 which divides the tubular member 22 into two sealed apart portions. A second partition 42 is also used to define in conjunction with partition 40, a pneumatic pressure reservoir chamber 44 within the confines of the inner tubular member 22 and the outer tubular member 20 (above the partition 42). The second portion of the inner tubular member 22 forms a chamber 46 containing hydraulic fluid therein. Chamber 46 is connected with variable volume hydraulic chamber 62 by means of a plurality of openings 48.

At the end of the inner tubular member 22 is a diaphragm 52 having a metering orifice 54 formed therein. A metering pin 55, which is carried by reciprocable extension 28, extends through the metering orifice 54 to restrict the flow of fluid therethrough and thus cushion the impact of the aircraft landing.

An annular stop 56 is secured to the outer periphery of tubular member 22 to limit extension of the strut as tubular member 26 moves downwardly (referring to Figure 2). When the strut is fully extended, a shoulder 58, which is operatively carried by tubular member 26, comes into engagement with stop 56.

The stop 56 is provided with a seal 60 which prevents the passage of fluid therethrough. The hydraulic fluid in chamber 62 is forced into chamber 46 during strut extension. To this end, an annular member 59 carried by shoulder 58 and slidably engaged with the outer surface of tubular member 22 is arranged to allow fluid to pass at a limited rate from chamber 62 to chamber 38 when a predetermined pressure drop thereacross is attained. The annular member 59 may be provided with a check valve, not shown, which opens to allow fluid to pass from chamber 38 to chamber 62 when the strut is contracted and which closes to restrict fluid flow from chamber 62 to chamber 38 when the strut is extended. The annular member 59 may have a relatively loose fit with the outer surface of tubular member 22 or may be provided a plurality of small openings, not shown, in parallel flow relationship with the check valve such that, when the check valve is closed, fluid will be allowed to escape at a relatively low rate from chamber 62 to chamber 38 as the strut approaches its fully extended position. This arrangement is conventional and well known to those skilled in the art as snubbing apparatus which apparatus acts to snub the strut action as the shoulder 58 approaches stop 56.

Referring to Figure 3, the reservoir 44 (shown schematically) is connected to pneumatic variable volume chamber 36 (shown schematically) through a control device designated generally by reference numeral 64. The purpose of device 64 is to tap off a sufficient quantity of pneumatic pressure from the reservoir 44 to raise the pneumatic pressure in chamber 36 to a definite level.

The regulator mechanism includes a valve 66 having a shoulder 68 which is held against valve seat 70 by a spring 72. When the shoulder 68 of the valve engages the valve seat 70, communication between the reservoir 44 and chamber 36 is severed. The regulator valve 66 is subjected at one side 74 to the pressure in reservoir chamber 44 and at the other side 76 to the pressure in pneumatic variable volume chamber 36. The differential pressure tends to unseat the valve 66 when the pressure in the reservoir chamber 44 exceeds the pressure in pneumatic variable volume chamber 36. Spring 72, however, prevents unseating of the valve 66, regardless of this differential pressure. Piston 75 is biased by spring 77 into engagement with end 78 of the regulator valve to unseat valve 66 and thus permit a buildup of pressure in chamber 36 until the differential pressure across the valve is reduced to the point where spring 72 returns the valve 66 into engagement with valve seat 70 against the resistance of spring 77.

The piston 75 is lifted out of engagement with end 78 of the regulator valve, against the resistance of spring 77, by a lever 80 which is connected to piston 75 through a boss 82 and stem 83 arrangement.

Before the chamber 36 is inflated, a venting port 84 which exhausts pressure from chamber 36 is closed by valve 86. The valve 86 is biased in a port closing direction by spring 88. The spring 88 is compressed between lever 80 and shoulder 90 of the valve. The valve 86 has a stem 91 and boss 92 in connection with the end of lever 80 so that as the lever is turned in a clockwise direction about pivot 94, the valve 86 is lifted from the venting port 84 to bleed pressure from chamber 36.

Spring 96 is compressed between a shoulder 98 of the mechanism 64 and the end of lever 80 to rotate the lever in a clockwise direction about the pivot 94, thus lifting the valve 86 to bleed the chamber 36 and to move piston 75 upwardly against the resistance of spring 77 so that spring 72 can hold regulator valve 66 in a closed position. This turning movement of the lever 80 by spring 96 occurs when threaded member 100 at one end of the lever 80 is moved out of engagement with stop 102. See dotted portion of lever 80 and threaded member 100 when out of engagement with stop 102. The stop 102 is mounted on a fixed part of the aircraft structure and as the strut is lowered from the wheel well, threaded member 100 is brought into engagement with stop 102 and the lever is rotated counterclockwise so that springs 77 and 88 locate piston 75 and valve 86, respectively, in the positions indicated in Figure 3.

Assume next that the strut is fully contracted and that tubular member 26 is fully telescoped within tubular members 20 and 22. This is the condition of the strut shown in Figure 2. Assume further that the strut is retracted within the wheel well of the aircraft. While the strut is retracted, the lever 80 indicated in Figure 3 is rotated clockwise from its illustrated position by the spring 96 since the member 100 is not in contact with stop 102. When the lever is thus rotated, the valve 86 is lifted from seat 84 so that chamber 36 is vented to the atmosphere through bleed port 84. Also, the spring 77 is compressed by piston 75 by virtue of the clockwise rotation of the lever produced by spring 96 so that the valve 66 is held in a seated position by spring 72 and thus prevents communication of chambers 44 and 36 across valve 66. While the strut is being lowered and simultaneously extended, the pneumatic variable volume chamber 36 increases in size since the piston 30 is moved downwardly by tubular member 26 (Figure 2).

Preparative to landing, the shrinkage mechanism 18 is actuated by the pilot to lower the strut out of the wheel well and into a vertical position relatively to the aircraft. The mechanism 18 will swing the strut downwardly on pivot 12. Extension of the strut is also obtained by a limited amount of air pressure in chamber 46 which tends to move tubular member 26 in an extending direction. The weight of the wheel 16 also assists in extending the strut.

When the strut is lowered, its angular movement about the pivotal mounting 12 brings the threaded member 100 into engagement with stop 102 to rotate the lever 80 counterclockwise about pivot 94. Contact of the threaded member 100 with stop 102 compresses the spring 96 by rotating the lever 80 counterclockwise (Figure 3) thus permitting spring 88 to bias valve 86 to the position shown in Figure 3 where it seals off the bleed or venting port 84 for penumatic chamber 36. The spring 77 is then permitted to bias piston 75 against the end 78 of the regulator valve to assist in unseating the valve against the resistance of spring 72. The pressure in chamber 44 is higher than the pressure in chamber 36 so that the valve 66 is cracked until chamber 36 is inflated to a certain pressure. When this certain pressure is reached, the differential pressure across valve 66 drops until the force spring 72 is sufficient to seat the valve 66 on shoulder 68, thus severing communication between pneumatic chamber 36 and reservoir 44.

When the aircraft wheel 16 contacts the ground during landing of the aircraft, the landing impact forces tubular member 26 in a telescoping direction, thus enlarging the size of the chamber 62 and forcing fluid through the metering orifice 54. The metering tube 55 restricts the orifice 54 and this throttled fluid flow absorbs a part of the landing impact. While chamber 46 fills with fluid, the fluid passes through opening 48 into the hydraulic variable volume chamber 62 which is increasing in size as the pistons 26 and 30 are moved in a telescoping direction by tubular member 26. Also the check valve, not shown, heretofore mentioned as part of conventional snubbing apparatus will open to allow fluid, which reaches chamber 38 via opening 50, to flow from chamber 38 to chamber 62.

While the piston 30 is thus moving, the pneumatic chamber 36 decreases in volume, thus compressing the entrapped pneumatic charge. The compressed pneumatic charge resists telescopic movement of the strut, thus providing a resilient cushion which serves to support the aircraft and to absorb the jarring effects of landing and taxiing. The compressed pneumatic charge in chamber 36 is also available to cushion the aircraft during takeoff for the following flight.

After the following takeoff, the mechanism 18 is actuated to swing the strut angularly about its pivotal support 12, thus moving threaded member 100 away from contact with the stop 102. The lever is rotated in a clockwise direction by spring 96 and the valve 86 is lifted out of engagement with its associated valve seat 84, thereby venting the pressure in chamber 36 through bleed port 84. The reduction in pressure in chamber 36 permits telescoping of the strut with greater facility by the shrinkage mechanism which simultaneously contracts the strut and retracts the strut into the wheel well of the aircraft.

If the pilot finds it necessary to inflate the chamber 36 to a greater extent than that provided by the regulator valve, there is provided a solenoid valve 108 for this purpose. It sometimes happens that the aircraft must land while it is fully loaded with fuel and other stores. In this case, it is necessary to provide greater resistance to strut telescoping in order to avoid "bottoming" of the strut and possible scraping of the stores upon the ground. The solenoid valve 108 is operatively connected to a valve 110 which controls communication between storage 44 and chamber 36 across check valve 111. When the solenoid valve 108 is operated, there is provided direct communication between storage 44 and chamber 36, thus equalizing the pressure in each. Assuming that the storage 44 is fully charged, this will produce a greater pressure in chamber 36 than that normally provided by regulator valve 66. When the chamber 36 is provided with a higher pneumatic pressure charge, then there is greater resistance to telescoping of strut 26 and this greater extension of the strut produces increased clearance of the aircraft from the ground.

Although this invention has been described in connection with but a single example embodiment, it will be apparent to those skilled in the art that numerous modifications thereof are possible without departing from the underlying principles. For example, the pneumatic pressure reservoir, which is indicated within the strut, may in some instances be located within the aircraft. Also, the reservoir may be charged from time to time through connection with a compressor within the aircraft so that it is constantly subject to charging instead of intermittent charge.

Other changes will suggest themselves to those skilled in the art after due consideration of the description.

I claim:

1. For an aircraft, an aircraft shock strut comprising relatively fixed first and second concentric tubular members operatively secured to the aircraft, a third tubular member concentric with and reciprocably movable relatively to and between said first and second concentric tubular members, said third tubular member operatively carrying at the one remote end thereof a ground engaging wheel, a piston means carried by said third tubular member at the other remote end thereof to form a variable volume first chamber of the annular space between the inner fixed tubular member and said reciprocable third tubular member, a second variable volume chamber formed by the annular space between said relatively fixed first and second concentric tubular members and having an effective volume determined by said piston means, partition means in said inner relatively fixed tubular member to divide the volume thereof into a metering chamber and a pneumatic pressure reservoir chamber, means for interconnecting said reservoir and said second variable volume chamber to communicate a determined air pressure charge from said reservoir and to said second variable volume chamber, said second variable volume chamber providing pneumatic cushioning in strut operation, control means combined with said interconnecting means to govern operation of said regulator means in pressurizing said second variable volume chamber preparative to landing while the strut is extended, valve means associated with said second variable volume chamber for venting the developed pressure in said second variable volume chamber to facilitate telescoping of said third tubular member relatively to said first and second tubular member, said valve means being operated by said control means to seal off the second variable volume chamber while it is being pressurized, said valve means being further operated by said control means to vent the second variable volume chamber while it is being simultaneously contracted and retracted, and means operatively combined with said reservoir and said second variable volume chamber for equalizing the pressure between said reservoir chamber and second variable volume chamber by establishing direct communication therebetween.

2. An aircraft shock strut comprising two relatively fixed concentrically mounted tubular members, a third tubular member slidably mounted between said first two concentric tubular members, means associated with said third tubular member to form in conjunction therewith two variable volume chambers within the annular confines between said two concentrically mounted tubular members, one of said variable volume chambers having hydraulic fluid therein, the other of said variable volume chambers being pneumatically inflatable to serve as a cushion for aircraft support, a pneumatic reservoir formed within the strut and between the confines of said two fixed concentrically mounted tubular members, said pneumatic reservoir serving to store a pneumatic charge under pressure, means for regulating pneumatic pressure from said reservoir to said pneumatically inflatable variable volume chamber, control means for actuating said regulating means responsively to strut position, a port for venting the pneumatic pressure in said pneumatically inflatable variable volume chamber, a valve for controlling said port to render the inflatable variable volume chamber airtight during inflation thereof by said regulating means, said valve being operatable by said control means responsively to strut position to vent pneumatic pressure from said inflatable chamber and thereby facilitate telescoping said third tubular member in said relatively fixed tubular members, and means for equalizing the pressure in said inflatable variable volume chamber and reservoir.

3. An aircraft strut comprising three telescopically mounted tubular members, two fluid tight variable volume chambers defined in part by the walls of said tubular members, piston means separating said variable volume chambers, the respective sizes of said variable volume chambers being regulated by relative telescopic movement of said tubular members, one of said variable volume chambers being a pneumatic chamber and expansible during strut extension, the other of said variable volume chambers containing hydraulic fluid and reducing in volume during strut extension, a reservoir chamber within said strut and defined by the walls of said tubular members, said reservoir being constructed to store a pneumatic charge under pressure, means for regulating pneumatic pressure from said reservoir to said pneumatic variable volume chamber when said strut is in extendible position, said pneumatic variable volume chamber being compressible by contraction of said strut to provide a resilient cushion which supports the aircraft and absorbs the impact of landing, valve means for bleeding pressure from said pneumatic variable volume chamber to the atmosphere to facilitate contraction of the strut preparative to retraction thereof into a wheel well, and control means to operate said pressure-bleeding means and pressure regulating means according to the angular position of the strut.

4. An aircraft strut comprising two fixed and one relatively movable tubular members, two variable volume chambers defined by said tubular members and containing pneumatic pressure and hydraulic fluid, a piston separating said two variable volume chambers, a reservoir within said strut for storing a pneumatic charge under pressure, means combined with said reservoir for regulating a quantity of pneumatic pressure from said reservoir to said pneumatic variable volume chamber when the strut is in an extendible position, said pneumatic variable volume chamber being reducible by strut contraction to provide a compressed air cushion forming resilient support for the aircraft, valve means for venting the pressure from said pneumatic variable volume chamber to the atmosphere to facilitate contraction of the strut preparative to retraction thereof into a wheel well, and means for operating said regulating means and venting means according to the angular position of said strut.

5. A strut comprising relatively fixed and movable members, a first and second variable volume chambers containing pneumatic pressure, a piston separating said two variable volume chambers, a reservoir for storing a pneumatic charge under pressure, means for regulating a quantity of pneumatic pressure from said reservoir to said first variable volume chambers when the strut is in an extendible position, said first pneumatic variable volume chamber being reducible by strut contraction to provide a compressed air cushion forming resilient support for the aircraft, valve means for venting the pressure from said first pneumatically inflatable variable volume chamber to the atmosphere to facilitate contraction of the strut preparative to retraction thereof into a wheel well, and means for operating said regulating means and venting means according to the angular position of said strut.

References Cited in the file of this patent
UNITED STATES PATENTS

| | | |
|---|---|---|
| 2,390,661 | Parilla | Dec. 11, 1945 |
| 2,492,765 | Porath | Dec. 27, 1949 |